United States Patent [19]
Judd, Jr.

[11] Patent Number: 5,013,417
[45] Date of Patent: May 7, 1991

[54] WATER PURIFIER

[76] Inventor: Lawrence M. Judd, Jr., 2414 Makiki Heights Dr., Honolulu, Hi. 96822

[21] Appl. No.: 528,691

[22] Filed: May 23, 1990

[51] Int. Cl.⁵ .................... C25B 15/00; C25B 9/00; C25B 9/04; C25B 11/02
[52] U.S. Cl. .................... 204/228; 204/242; 204/271; 204/286; 204/293; 204/288
[58] Field of Search ............ 204/242, 271, 228, 293, 204/286, 288, 275–278, 149

[56] References Cited

U.S. PATENT DOCUMENTS

| | | | |
|---|---|---|---|
| 1,862,663 | 6/1932 | Curtis | 204/149 |
| 3,222,269 | 12/1965 | Stanton | 204/278 X |
| 3,458,414 | 7/1969 | Crane et al. | 204/149 |
| 3,654,119 | 4/1972 | White et al. | 204/228 |
| 3,891,535 | 6/1975 | Wikey | 204/275 |
| 4,089,768 | 5/1978 | Fischer et al. | 204/228 |
| 4,121,991 | 10/1978 | Miller et al. | 204/260 |
| 4,236,990 | 12/1980 | King | 204/275 |
| 4,263,114 | 4/1981 | Shindell | 204/149 |
| 4,328,084 | 5/1982 | Shindell | 204/228 |
| 4,337,136 | 6/1982 | Dahlgren | 204/242 |
| 4,419,206 | 12/1983 | Frame | 204/228 |
| 4,488,031 | 12/1984 | Roberts | 219/69.1 |
| 4,492,618 | 1/1985 | Eder | 204/152 |
| 4,525,253 | 6/1985 | Hayes et al. | 204/149 |
| 4,525,272 | 6/1985 | Henson | 210/149 |
| 4,640,782 | 2/1987 | Burleson | 210/748 |
| 4,640,783 | 2/1987 | Kern | 210/760 |
| 4,710,282 | 12/1987 | Chak et al. | 204/228 |
| 4,713,170 | 12/1987 | Saibic | 210/85 |
| 4,769,119 | 9/1988 | Grundler | 204/149 |
| 4,936,979 | 6/1990 | Brown | 204/228 |

FOREIGN PATENT DOCUMENTS 8601543   3/1986   World Int. Prop. O. .......... 204/271

OTHER PUBLICATIONS

Gerba, Charles P., Ph.D., "Swimming Pool Disinfection" Journal of Environmental Health, vol. 51, No. 5, pp. 282 to 285.

Primary Examiner—Donald R. Valentine
Attorney, Agent, or Firm—Martin E. Hsia

[57] ABSTRACT

A water purifier including a floating body having two parallel disk shaped electrodes extending into the water. The polarity between the disks is alternated at predetermined intervals to avoid plating. The disks are preferably made of a copper/silver alloy. Preferably the device is powered by a photovoltaic panel attached to a skimmer cover. Alternatively, the device can be powered by a photovoltaic panel laminated to the top or the device can be configured for insertion into a pipe plug unit that can be used in connection with a pipe T.

34 Claims, 5 Drawing Sheets

WATER PURIFIER

BACKGROUND OF THE INVENTION

This invention relates to a water purifier that preferably uses copper and silver ions to purify water, the copper ions destroying algae and the silver ions destroying bacteria.

The use of these beneficial minerals dates back centuries to the early ages of the Greeks and Romans, who used copper and silver coins in their water containers to keep their water potable. In more recent history, the pioneers trekking across North America in their covered wagons also used copper and silver coins in their oaken water casks. The copper and silver ions discharged by the coins killed the algae and bacteria, keeping the water potable during their long journey. They didn't know why, but it worked.

European countries have for many years been using copper and silver ions to control algae and bacteria in swimming pools and catchments with various crude devices using electric current passing between metal electrodes to discharge the ions into the water. In fact, there are some areas that prohibit the use of chlorine.

NASA developed further the use of copper and silver ions using low voltage direct current. At the present time, there are various ionization generators on the market, some complicated and costly, converting AC current to DC current and using metal rods placed in a pipe T fitting as electrodes. The pipe T would be placed in line with the water circulation pipes of swimming pool filter systems.

More recently offered on the market are flotation devices with photovoltaic cells attached to the top of the float and rods projecting from the bottom as electrodes. In some designs, one rod is composed of a copper/silver alloy and the opposing rod is of stainless steel. In other designs, a single copper/silver rod is surrounded by a metal coil or screen, acting as an opposing electrode.

Examples of the above devices and similar devices are disclosed in several U.S. patents.

U.S. Pat. No. 4,337,136 to Dahlgren discloses a floating container having a pair of silver-copper alloy electrodes extending from the bottom. The container holds a battery which is connected in circuit with the electrodes through a timer switch and a current reversing switch.

U.S. Pat. No. 4,525,253 to Hayes discloses a purification cell having two electrodes containing copper, silver and nickel. The purification cell is connected in line with the filtering system of a swimming pool.

U.S. Pat. No. 4,236,990 to King discloses a treater for aerating a liquid having a pair of closely spaced circular electrode plates with an annular groove adjacent to the discharge periphery of the lower plate that pressurizes the water passing between the plates to cause the discharging liquid to assume an umbrella like configuration.

U.S. Pat. No. 4,710,282 to Chak discloses a device for silverizing running water containing a plurality of disk shaped electrodes, each of which has either peripheral or central openings, each of which also is tightly surrounded by a main housing so that the water repeatedly changes its direction as it flows through the openings.

U.S. Pat. No. 4,713,170 to Saibic discloses a substantially "T" shaped hollow pipe fitting with a cylindrical electrical anode and an electrical cathode assembly.

U.S. Pat. Nos. 4,328,084 and 4,263,114 to Shindell disclose an apparatus and method for the treatment of water by adding salt to make the water slightly conductive and by circulating the water through an electric field between a pair of electrode plates.

U.S. Pat. No. 4,492,618 to Eder discloses a method of disinfecting water by immersing electrodes of a copper-silver alloy in the water, applying a direct current source of alternating polarity to the electrodes and adding sodium persulfate to the water.

U.S. Pat. No. 4,525,272 to Henson discloses an electrochemical ionization system for purifying water.

U.S. Pat. No. 3,654,119 to White discloses an oligodynamic treatment of liquids by passing liquids over electrodes of a copper and silver alloy.

U.S. Pat. No. 4,769,119 to Grundler discloses a water ionizing device having three concentric electrodes, the center one of silver and the others of copper.

U.S. Pat. No. 3,458,414 to Crane discloses a swimming pool conditioner having an electrolytic cell and a chemical dispenser.

All of these prior devices present retrofitting or aesthetic problems. For example, the pipe T fitting devices require that the swimming pool filter system be adapted for a pipe T. Because of the electrical and plumbing expenses involved, these devices are costly to install. It is also costly, time consuming and inconvenient to inspect the condition of these rods as they wear and to replace the rods.

The flotation devices present an aesthethic problem because they are extremely obvious on the surface of the water.

Most of the above devices use rods for electrodes, which is relatively inefficient because of the relatively small effective area being exposed to the water.

Accordingly, there is a need for a device that can be easily and inexpensively retrofitted to existing swimming pools and yet will retain the advantages and overcome the disadvantages of the previously described systems.

It is therefore an object of this invention to provide a device for purifying water which can be easily retrofitted to existing swimming pool installations.

It is a still further object of this invention to provide such a device that is easily accessible for maintenance and is easily maintained by the user.

It is a still further object of this invention to provide such a device with efficiently configured electrodes so that the device may be made smaller.

It is still further object of this invention to provide such a device that reduces the amount of chlorine necessary to maintain the purity of the water.

It is a still further object of this invention to provide such a device that is simple in construction and easy and inexpensive to manufacture.

It is a still further object of this invention to provide such a device that is hidden from view and therefore does not interfere with the aesthetic appearance of a pool.

It is a still further object of this invention to provide such a device that can be adjusted for various factors, such as pool size, water composition, circulation system and others.

SUMMARY OF THE INVENTION

These and other objects are obtained by a water purification device that can be retrofitted into existing skimmer units. Most pools include a skimmer unit that is used to "skim" off floating debris from the surface of the pool. In most pools, the water inlet ports are so configured that any surface debris, such as leaves and other floating objects, is directed towards the inlet port for the skimmer. The skimmer usually has a water skimmer enclosure into which a basket, sieve or other device (hereinafter referred to as a "basket") is placed to trap this floating debris. The basket is periodically cleaned of the accumulated debris. The skimmer usually is situated adjacent to the pool and contains an easily removable cover for easy access to the basket for cleaning. The skimmer is usually positioned at the intake of the water filtering system.

The device includes a floating casing having an inner disk shaped electrode attached to the bottom and having an outer disk shaped electrode attached underneath the inner electrode spaced apart from and substantially parallel to the inner electrode. The inner and outer electrodes are preferably made of a copper-silver alloy (although other metals can be used) and are connected to a circuit that includes a direct current ("DC") source, a polarity reversing mechanism and an adjustable switch. The device is placed in the skimmer and is powered remotely, preferably by photovoltaic cells attached to the cover of the skimmer unit, although other DC power sources, such as batteries or rectified household current from outlets inside or outside the skimmer unit, can be employed.

Because the device floats inside the skimmer, which is usually positioned at the opening of the intake system, the ions created by the action of the electrodes are dispersed widely throughout the water. Further, the device is hidden from view by the skimmer cover. Moreover, if the power source is photovoltaic cells placed in the cover of the skimmer, then no plumbing changes or electrical wiring are necessary if the photovoltaic cells are attached to a replacement skimmer cover.

The disks are attached to a supporting screw and are preferably separated by insulating washers interposed between them to form a space between the two disks allowing a flow of water to freely pass between this space. This allows a maximum volume of water to be treated.

The supporting screw passes through center holes in each disk. The hole of the inner disk is substantially larger than the diameter of the supporting screw, allowing an insulating plug to be inserted in this hole, thus insulating the inner disk from the supporting screw. A washer and locking nut placed on the end of the supporting screw locks the outer disk to the screw. The supporting screw is electrically connected to the power source, switch and polarity reversing device. The supporting screw becomes one of the terminals for the DC current, insulated from the inner metal disk but in direct contact with the outer disk.

Concentrically surrounding the head of the supporting screw are three smaller contact screws electrically connected to each other by a wire, which are connected to the current source of opposite polarity to the supporting screw. Thus, all three contact screws are of opposite polarity from the supporting screw. The screw heads of all three contact screws protrude from the body of the casing. As a result, the inner surface of the inner disk comes in direct contact with all three heads of the protruding contact screws. The current of one polarity passes directly to the inner disk and the current of the opposite polarity passes by way of the supporting screw to the outer disk. Thus the copper/silver disks are oppositely polarized.

The two copper/silver disks may be replaced rapidly by removing the single nut on the supporting screw. The large flat surface area of the opposing electrodes greatly increases the effective area of ionization exposed to the flow of water when compared to rod systems. The disks are spaced apart sufficiently so that the flow of water between them is unobstructed (this is to be contrasted with the patent to King described above, which specifically requires that the plates be sufficiently close to pressurize the liquid passing between them, and with the patent to Chak described above, which requires that water flow through alternately peripheral and central openings in a plurality of disk shaped electrodes). The disk configuration and unobstructed flow of water also contribute to more even wear of the electrode surfaces. In addition, the spacing between the opposing disk electrodes may be adjusted easily by changing the thickness or number of insulating washers, permitting adjustment of current flow. Additional adjustment is possible by using various diameters of disks. For example, the larger the diameter, the higher the current, the larger the space between the disks, the lower the current, etc. This permits adjusting the current flow based on the available power input, pool size, water chemistry, bathing load, water temperature, etc.

Of course, because the device is compact, it may be easily adapted to a variety of designs, such as self powered or remote powered float devices, pipe T adapters, etc. Further, the device can be used wherever potable water is desired, such as in water catchments, water tanks or other water containers, by placing the device inside the container and mounting photovoltaic cells on the outside of the container. This would be especially useful in areas where potable water and electricity are scarce, such as in lesser developed countries or rural areas.

DESCRIPTION OF THE PREFERRED EMBODIMENT

Figure 1:
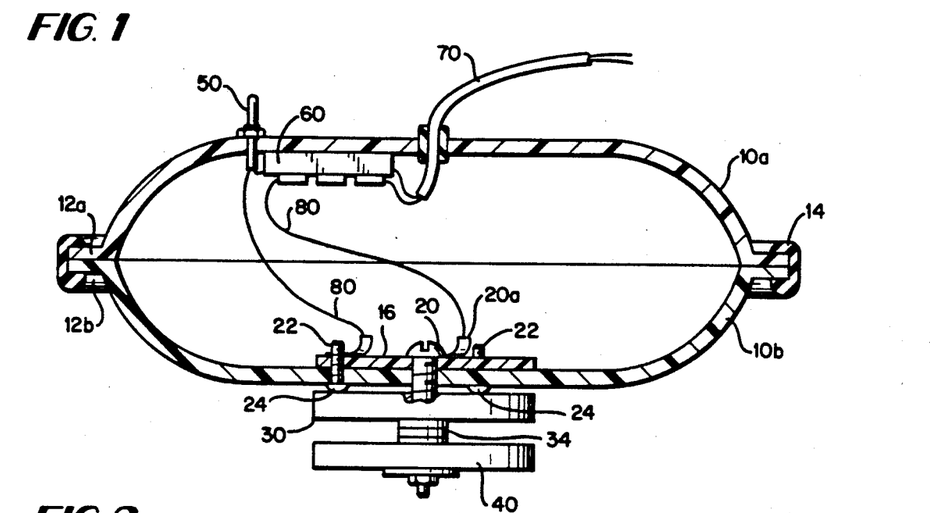
FIG. 1 is a sectional elevational view of a preferred embodiment of a device in accordance with this invention.

Referring to FIG. 1, the preferred embodiment comprises a nonconductive floating casing 10, preferably comprised of two identical bowl shaped halves, a top bowl 10a and a bottom bowl 10b, attached together at their rims 12a and 12b. A rubber bumper 14 is preferably attached around the periphery of the attached rims 12a and 12b. An electrode panel 16 is attached to the bottom of the bottom bowl 10b and is retained in place by a conducting support member, preferably a center support screw 20, that passes through the electrode panel 16 and the bottom bowl 10b. The shaft of the center support screw 20 therefore extends outside the bottom bowl 10b. Preferably the center support screw 20 is a slotted round head screw that passes through a wire connector 20a and a star washer (not shown).

The electrode panel 16 also is attached to the bottom bowl 10b by conducting contact members, preferably three (3) contact screws 22, inserted through washers (not shown), through the bottom of the bottom bowl 10b and into the electrode panel 16. The heads 24 of the contact screws 22 abut against and protrude from the bottom surface of the bottom bowl 10b. The contact screws 22 are preferably small round head screws.

The electrode panel 16 preferably is a round disk made of nonconductive material (preferably ⅛th inch thick PVC plastic material) that is laminated with an adhesive sealant to the bottom bowl 10b of the casing 10 with holes provided for the contact screws 22 and the center support screw 20. Preferably the electrode panel 16 has countersunk areas on the back to form a pocket for sealant.

It is preferred that a high grade waterproof sealant be applied between the electrode panel 16 and the bottom bowl 10b. It is also preferred that an adhesive sealant be compressed into countersunk holes at the bottom of the bottom bowl 10b so that a watertight seal is obtained. It is further preferred to dip the electrode panel and all electronic connections in a waterproofing material before installing them. The bottom bowl 10b of the casing is preferably filled with foam, preferably closed cell urethane foam (not shown), prior to assembling with the top bowl 10a, with any excess foam being cut away (injecting foam after assembly is not presently preferred because the expanding foam may cause bursting, although injection would be preferred if the bursting problem could be avoided). The addition of foam and a waterproofing coating allows the device to continue floating and functioning even if leaks or cracks develop in the casing 10, which enhances durability.

Figure 3:
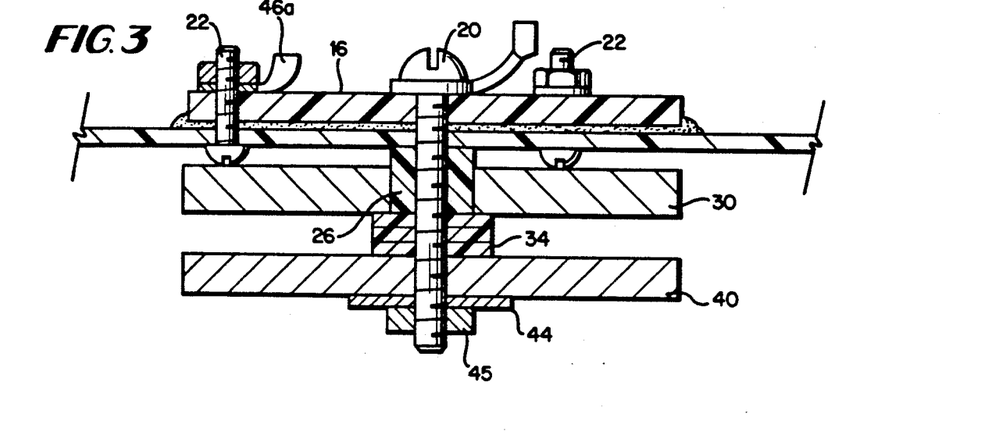
FIG. 3 is a detailed sectional elevational view of the electrode assembly of the preferred embodiment of FIG. 1.
Figures 4, 5, 6, 7:
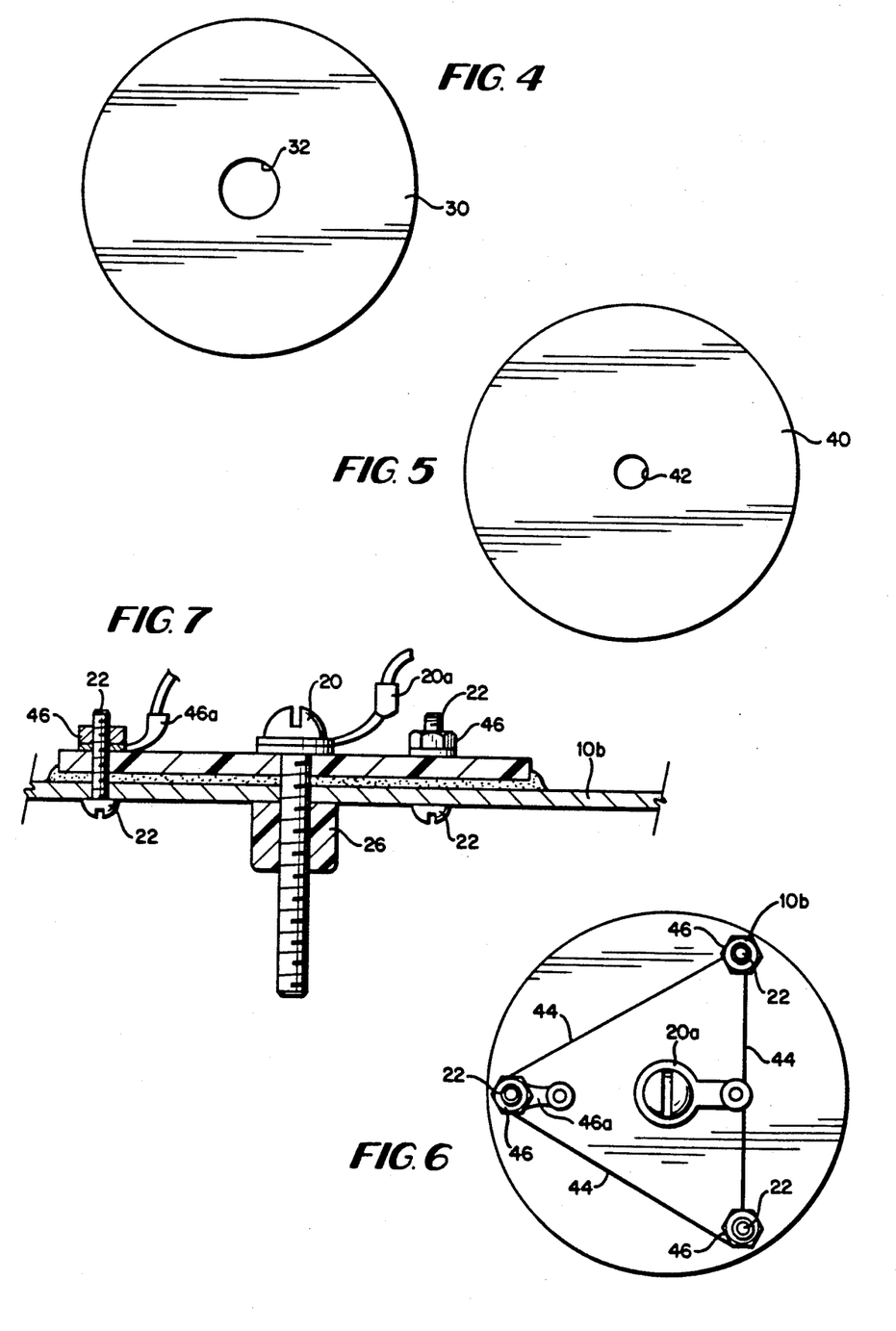
FIG. 4 is a top view of the inner disk electrode thereof.
FIG. 5 is a top view of the outer disk electrode thereof.
FIG. 6 is a top plan view of the electrode plate thereof.
FIG. 7 is a side cut-away view of the electrode plate thereof.

Referring to FIGS. 3 to 5, an insulating plug 26 is mounted over the center support screw 20. An inner metal disk 30 comprising 90% to 95% copper and 5% to 10% silver (preferably of a 95% copper and 5% silver alloy) having a center hole 32 large enough to accommodate the insulating plug 26 is mounted over the insulating plug 26 and the center support 20 and abuts against the heads 24 of the contact screws 22. The inner metal disk 30 therefore is in electrical contact with the contact screws 24 but is insulated from the center support screw 20.

An insulating spacer 34 (which can be either a single spacer or, preferably, a plurality of insulating washers) is then mounted on the center support screw 20 and abuts against the outer surface of the inner metal disk 30.

An outer metal disk 40, preferably of the same composition as the inner disk, having a center hole 42 sufficiently large to accommodate the center support screw 20 is then mounted on the center support screw 20, preferably in electrical contact with the center support screw 20 and abutting against the insulating spacer 34.

A removable retaining member, preferably a washer 44 and a nut 45, is then mounted on the center support screw 20 abutting against the bottom surface of the bottom metal disk 40 in order to retain the inner metal disk 30, the insulating spacer 34 and the outer metal disk 40 in their respective positions on the center support screw 20. The washer 44 and nut 45 are preferably electrically conducting so that the outer metal disk 40 is in electrical contact with the center support screw 20.

Figure 8:
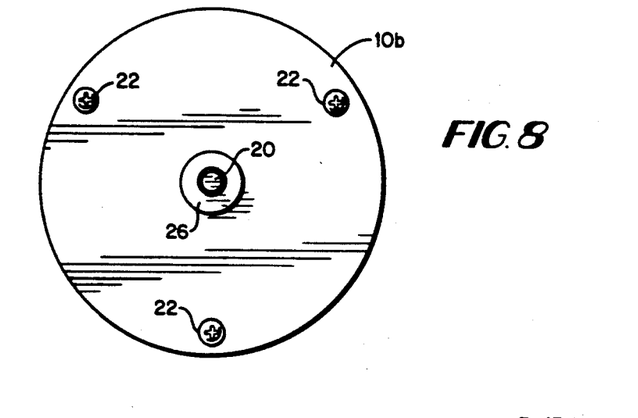
FIG. 8 is a bottom plan view of the electrode plate thereof with the bottom bowl omitted for clarity.

Referring to FIGS. 6 to 8, all of the contact screws 22 are electrically connected to each other with connecting wire 44 and preferably are retained in place by nuts 46. Preferably also, a wire connector 46a is attached to one of the nuts 46. Similarly, a wire connector 20a is preferably provided for the center support screw.

Returning to FIG. 1, the top bowl 10a is preferably provided with a power selector switch 50 and an alternator panel 60. Preferably also, power wires 70 lead from the alternator panel 60 to an electrical power source. The alternator panel 60 and the power selector switch 50 are electrically connected to the center support screw wire connector 20a and the contact screw wire connector 46a by internal wires 80.

Figure 2:
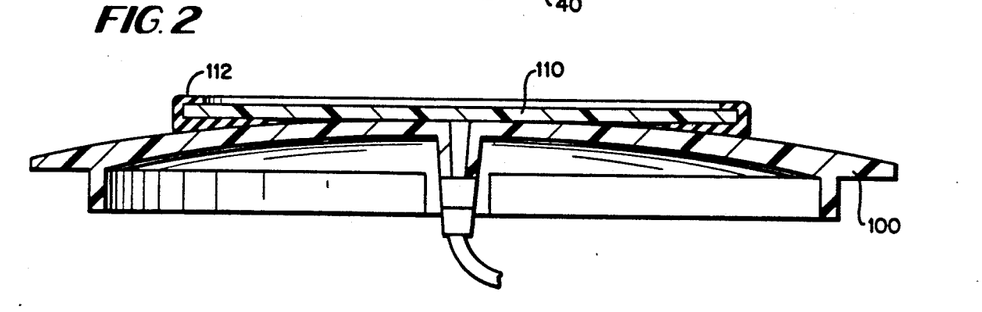
FIG. 2 is a sectional elevational view of a preferred embodiment of a skimmer cover having a photovoltaic panel in accordance with this invention.

Referring to FIG. 2, preferably the power line 70 leads to a skimmer cover 100 that has a photovoltaic panel 110 attached to the top. Preferably the photovoltaic panel provides a current with a maximum of approximately 500 milliamps and a voltage between approximately 7 and approximately 9 volts. Preferably the photovoltaic panel 110 is laminated to the top of the skimmer cover 100 and is provided with a bead 112 of flexible rubber to provide support for the photovoltaic panel 110 because photovoltaic panels normally are flat, while skimmer covers normally are convex. Preferably the photovoltaic cells are crystalline or amorphous silicon cells laminated with a protective coating to withstand physical abuse. Preferably the lamination comprises Teflon ®. Preferably also the backing and other exposed parts of the skimmer cover are white to minimize heating of the photovoltaic cells because photovoltaic cells lose efficiency if they are heated.

Figure 9:
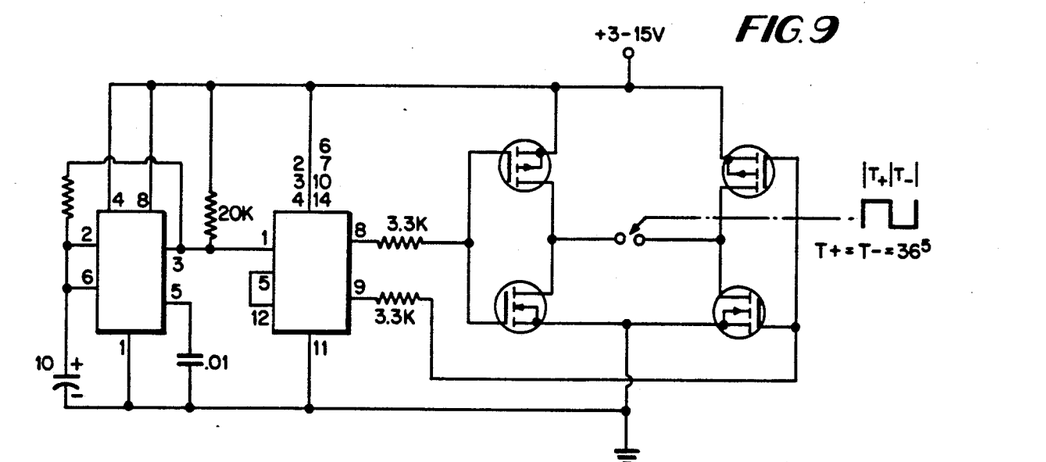
FIG. 9 is an electrical schematic diagram of the preferred alternator for the embodiment of FIG. 1.

Referring to FIG. 9, shown is an electrical schematic of a preferred alternator for this invention that provides automatic current reversing to prevent plating. It is preferred that the polarity be alternated at approximately 5 to 6 minute intervals.

Figure 10:
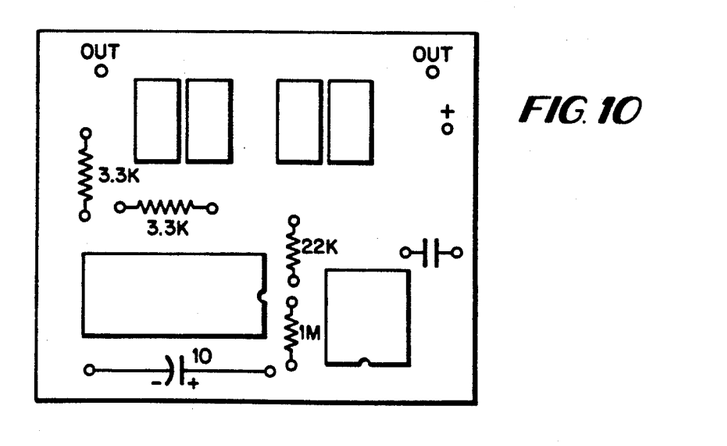
FIG. 10 is a diagram of the foil side of the electrical panel for the embodiment of FIG. 1.
Figure 11:
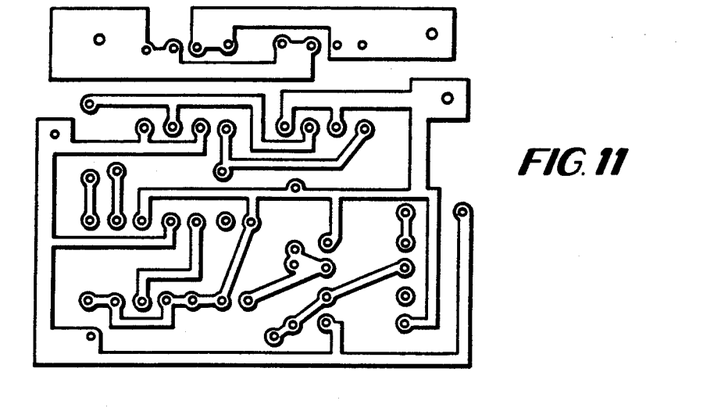
FIG. 11 is a plan view of the foil side of the electrical panel of FIG. 10.

Referring to FIGS. 10 and 11, shown are preferred layouts and electrical connections for the alternator panel 60.

Figures 12, 13, 14:
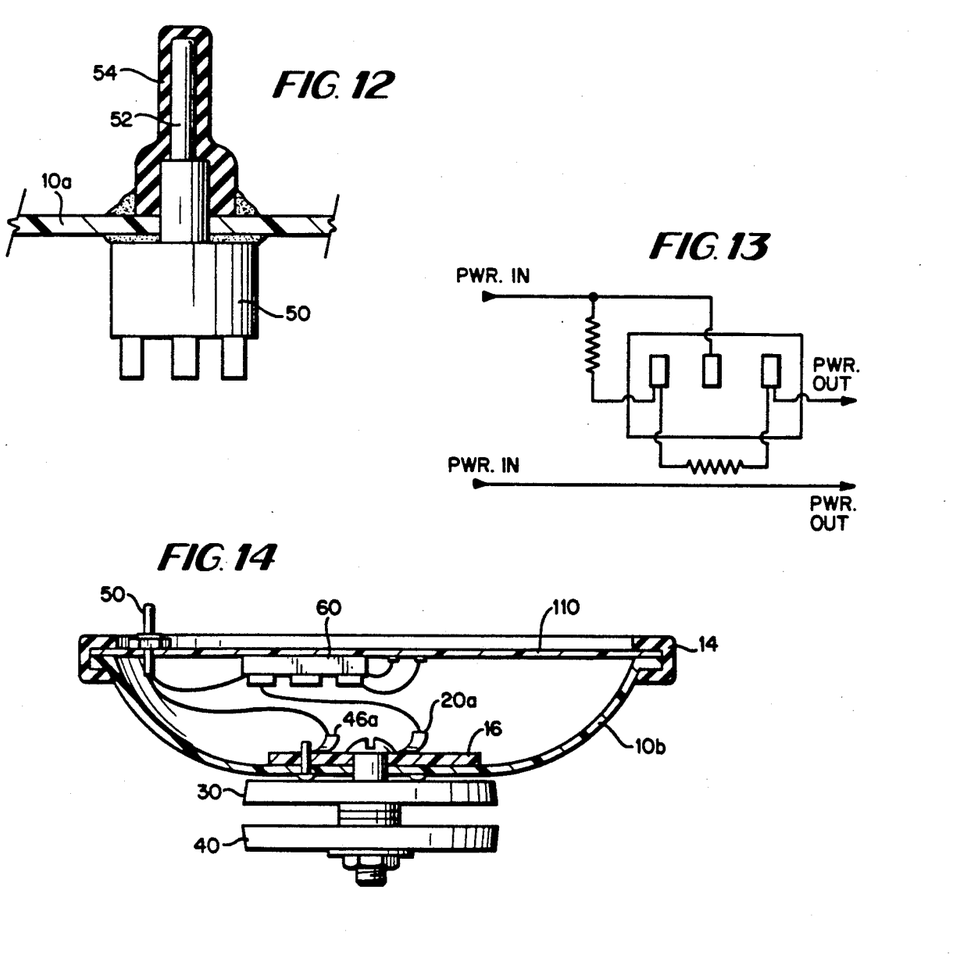
FIG. 12 is an elevational sectional view of the power selector switch for the embodiment of FIG. 1.
FIG. 13 is an electrical schematic diagram of the power selector switch of FIG. 12.
FIG. 14 is an elevational sectional view of an alternative embodiment of this invention that is self powered by photovaltic cells mounted on top.

Referring to FIG. 12, shown is a preferred power selector switch 50 with three positions controlled by a toggle 52. Preferably a waterproof boot 54 is placed over the protruding toggle of the toggle switch. Preferably the switch projects vertically from the horizontal portion of the top bowl 10a so that the switch does not bump against the sides of the skimmer.

FIG. 13 discloses an electrical schematic for the preferred toggle switch.

The preferred input voltage from the alternator and the switch is 3 to 15 volts (with 7 to 9 volts being ultimately preferred) and the preferred current is a maximum 0.5 amps.

FIG. 14 discloses an alternative embodiment that can float in a pool and is self powered. The bottom bowl 10b, electrode panel 16, inner metal disk 30, outer metal disk 40 and electrical connections are the same as in the embodiment previously described. The photovoltaic panel 110 is laminated to the top of the bottom bowl 10b. The alternator panel 60 and power selector switch 50 are similarly attached to the bottom surface of the photovoltaic panel 110. This embodiment can be used to float on the surface of a pool, if, for example, the skimmer cover for that pool does not receive sufficient sunlight for operation of the device in the skimmer, or the pool does not have a skimmer.

Figure 15:
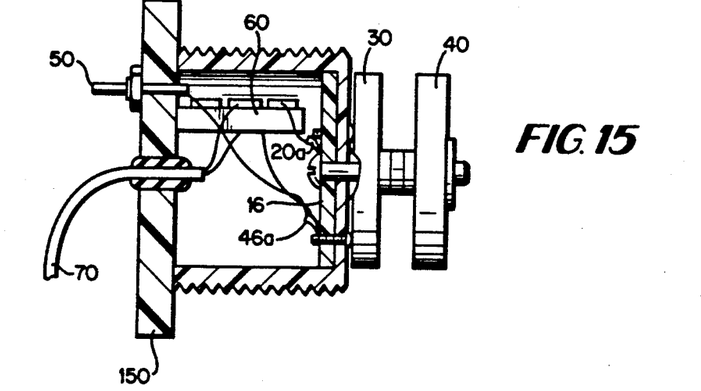
FIG. 15 is an elevational sectional view of another preferred embodiment of this invention adapted for use in a pipe Tee.
Figure 16:
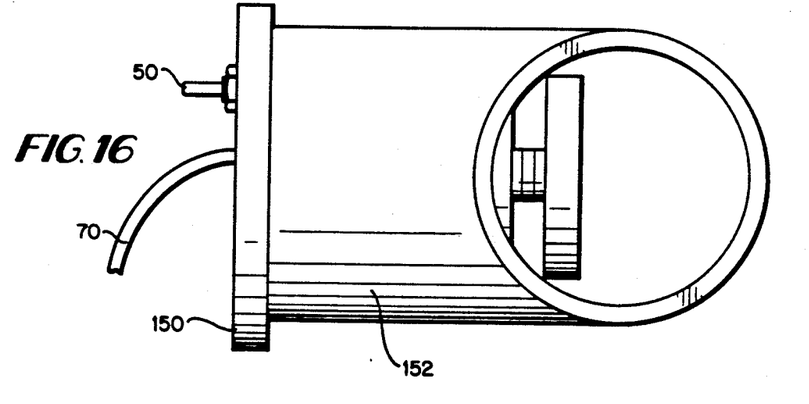
FIG. 16 is an elevational view of the embodiment of FIG. 15 as installed in a pipe Tee.
Figure 17:
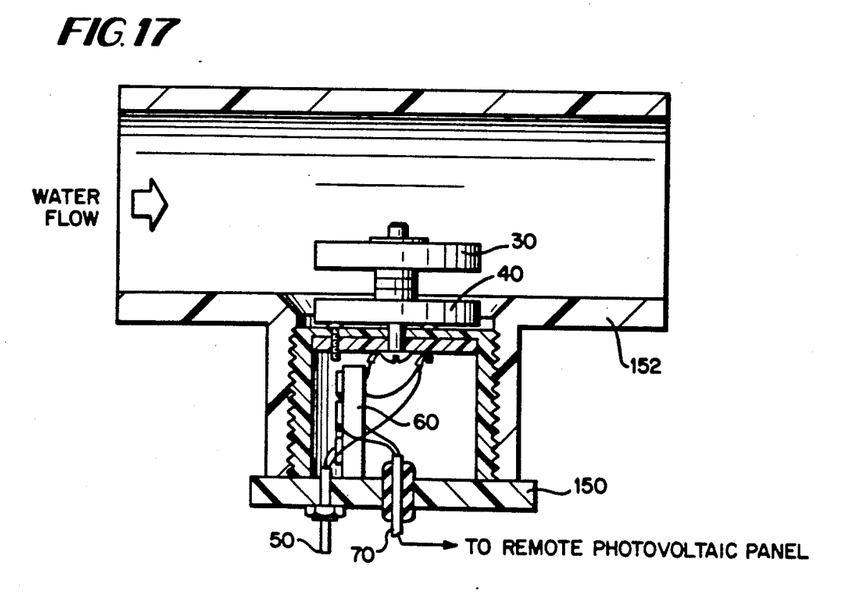
FIG. 17 is a plan sectional view of FIG. 16.

FIG. 15 discloses another embodiment of the invention adapted for a pipe Tee fitting. Instead of two bowl shaped halves 10a and 10b or a flat top half 10a and a bowl shaped bottom half 10b, the casing is a threaded pipe plug 150 with a forward end. The electrode assembly remains the same, as do the alternator 60 and the selector switch 50. As shown in FIG. 16, the pipe plug with the attached electrode unit then is plugged into a pipe Tee 152 so that the forward metal disk 40 and the spacer 34 protrude into the water flow. The power cord 70 extends from the pipe plug and can be connected to a remote power source, such as a photovoltaic panel or an AC-DC adapter, as was the case with the preferred embodiment for a skimmer.

This invention has been disclosed with respect to particular preferred embodiments. It will be appreciated by those skilled in the art that many modifications can be made to the disclosed embodiments without departing from the spirit and scope of the invention. Thus, "insulating spacer" and "insulating plug" shall be deemed to include a plurality of insulating washers. Moreover, "electric power source" shall be deemed to include batteries, photovoltaic cells, rectified household current and any other suitable source of electric power. The disk shaped electrodes need not be mounted on the support member by central holes, but could instead be mounted using clips or other mounting means. An insulating spacer is not necessary to maintain the distance between the electrodes. Further, the invention is applicable to other environments in addition to swimming pools, including water catchment systems, water tanks and other water containers in which potable water is required or desired (collectively referred to as "water containers"). For example, the invention can be used in water catchment systems in areas in which potable water and electricity are scarce or non-existent (such as in certain regions of lesser developed countries) or in water tanks for recreational vehicles. Accordingly, no limitations are to be implied or inferred except as specifically and explicitly set forth in the attached claims.

What is claimed is:

1. A water purifier, comprising:
   an insulating waterproof floating casing having a bottom, a support member aperture in said bottom, and at least one contact member aperture in said bottom;
   a conducting support member mounted in said support member aperture and extending downwards from the bottom of said casing;
   a conducting contact member mounted in each of said contact member apertures and protruding from the bottom of said casing;
   an insulating plug mounted on said support member;
   a substantially disk shaped inner electrode mounted on said insulating plug and in electrical contact with said contact members;
   a substantially disk shaped outer electrode mounted on said support member spaced apart from and substantially parallel to said inner electrode and in electrical contact with said support member;
   a removable retaining member mounted on said support member for removably retaining said outer electrode on said support member; and
   an electrical power source connected to said support member and said contact members to provide said inner electrode and said outer electrode with electrical power.

2. A water purifier according to claim 1, wherein:
   said electrical power source comprises:
   photovoltaic cells mounted on a skimmer cover.

3. A water purifier according to claim 1, wherein:
   said electrical power source comprises:
   photovoltaic cells mounted on said casing.

4. A water purifier, comprising:
   an insulating pipe Tee casing having a threaded hollow base portion connected to a transverse hollow cross portion;
   a pipe plug having a forward end adapted to be retained in said base portion of said insulating pipe Tee, whereby said forward end projects into said hollow base portion when said pipe plug is retained in said pipe Tee, said forward end having a support member aperture and at least one contact member aperture;
   a conducting support member mounted in said support member aperture and extending forwardly from said forward end;
   a conducting contact member mounted in each of said contact member apertures and protruding from said forward end;
   an insulating plug mounted on said support member;
   a substantially disk shaped inner electrode mounted on said insulating plug and in electrical contact with said contact members;
   a substantially disk shaped outer electrode mounted on said support member spaced apart from and substantially parallel to said inner electrode and in electrical contact with said support member;
   a removable retaining member mounted on said support member for removably retaining said outer electrode on said support member; and
   an electrical power source connected to said support member and said contact members to provide said inner electrode and said outer electrode with electrical power.

5. A water purifier according to claim 4, wherein:

said electrical power source comprises:
photovoltaic cells remote from said pipe Tee.

6. A water purifier, according to any one of claims 2, 3 or 5, wherein:
said photovoltaic cells comprise:
silicon cells laminated with a protective coating.

7. A water purifier, according to claim 6, wherein:
said silicon cells comprise:
crystalline silicon cells.

8. A water purifier, according to claim 6, wherein:
said silicon cells comprise:
amorphous silicon cells.

9. A water purifier according to claim 4, wherein:
said electrical power source comprises:
rectified household current.

10. A water purifier according to any one of claims 1 or 4, further comprising:
an alternator mounted in said casing to alternate the polarity of said electrical power at predetermined intervals;
whereby said electrodes are provided with electrical power of alternating polarity.

11. A water purifier according to claim 10, wherein said predetermined intervals are between approximately five and approximately six minutes.

12. A water purifier according to any one of claims 1 or 4, wherein:
said electrodes comprise an alloy of copper and silver.

13. A water purifier, according to claim 12, wherein:
said alloy comprises between approximately 90% and approximately 95% copper and between approximately 10% and approximately 5% silver.

14. A water purifier, according to claim 13, wherein:
said alloy comprises approximately 95% copper and approximately 5% silver.

15. A water purifier according to any one of claims 1 or 4, wherein:
said electrical power is adjustable to a maximum of 500 milliamps.

16. A water purifier according to any one of claims 1 or 4, wherein:
said electrical power is provided at a voltage between approximately 7 and approximately 9 volts.

17. A water purifier, according to any one of claims 1 or 4, further comprising:
foam placed inside said casing.

18. A water purifier, according to claim 17, wherein said foam comprises urethane foam.

19. A device for purifying water, comprising:
a water container;
an insulating waterproof floating casing adapted for floating inside said container having a bottom, a support member aperture in said bottom, and at least one contact member aperture in said bottom;
a conducting support member mounted in said support member aperture and extending downwards from the bottom of said casing;
a conducting contact member mounted in each of said contact member apertures and protruding from the bottom of said casing;
an insulating plug mounted on said support member;
an inner substantially disk shaped electrode mounted on said insulating plug and in electrical contact with said contact members;
an outer substantially disk shaped electrode mounted on said support member spaced apart from and substantially parallel to said inner electrode and in electrical contact with said support member;
a removable retaining member mounted on said support member for removably retaining said outer electrode on said support member; and
an electrical power source connected to said support member and said contact members to provide said inner electrode and said outer electrode with electrical power.

20. A device according to claim 19, wherein said electrical power source comprises:
a photovoltaic cell mounted on said container; and
a power line electrically connecting said photovoltaic cell to said support member and said contact members having sufficient length to allow said casing to float on water inside said water container.

21. A device according to claim 20, wherein:
said photovoltaic cells comprise:
silicon cells laminated with a protective coating.

22. A device according to claim 21, wherein:
said silicon cells comprise:
crystalline silicon cells.

23. A device according to claim 21, wherein:
said silicon cells comprise:
amorphous silicon cells.

24. A device according to claim 19, wherein said electrical power source comprises:
rectified household current.

25. A device according to claim 19, further comprising:
an alternator mounted in said container to alternate the polarity of said electrical power at predetermined intervals;
whereby said electrodes are provided with electrical power of alternating polarity.

26. A device according to claim 25, wherein said predetermined intervals are between approximately five and approximately six minutes.

27. A device according to claim 19, wherein:
said electrodes comprise an alloy of copper and silver.

28. A device according to claim 27, wherein:
said alloy comprises between approximately 90% and approximately 95% copper and between approximately 10% and approximately 5% silver.

29. A device, according to claim 28, wherein:
said alloy comprises approximately 95% copper and approximately 5% silver.

30. A device according to claim 19, wherein:
said electrical power is adjustable to a maximum of 500 milliamps.

31. A device according to claim 19, wherein said electrical power is provided at a voltage between approximately 7 and approximately 9 volts.

32. A device according to claim 19, further comprising:
foam placed inside said casing.

33. A device according to claim 32, wherein said foam comprises urethane foam.

34. A device according to claim 19, wherein said water container is a pool skimmer.

* * * * *